United States Patent [19]
Kobayashi

[11] Patent Number: 5,215,132
[45] Date of Patent: Jun. 1, 1993

[54] VALVE DEVICE FOR FUEL TANK
[75] Inventor: Jiro Kobayashi, Isehara, Japan
[73] Assignee: Nissan Motor Co., Ltd., Yokohama, Japan
[21] Appl. No.: 889,561
[22] Filed: May 28, 1992
[30] Foreign Application Priority Data
  May 31, 1991 [JP] Japan .................................. 3-129144
  May 31, 1991 [JP] Japan .................................. 3-129146
[51] Int. Cl.$^5$ .............................................. B65B 1/04
[52] U.S. Cl. ...................................... 141/302; 141/44;
         220/746; 55/387; 123/518; 137/587
[58] Field of Search ...................... 141/302, 44, 45, 46,
         141/59; 220/749, 746; 137/587, 588, 587;
         123/518, 519; 55/387; 137/423, 428, 433

[56] References Cited
U.S. PATENT DOCUMENTS
3,907,153  9/1975  Mutty ................................. 55/387
4,815,436  3/1989  Sasaki et al. ....................... 220/746
5,014,742  5/1991  Covert et al. ...................... 141/46
5,054,528 10/1991  Saitoh ................................ 137/587

FOREIGN PATENT DOCUMENTS
1-131619 9/1989 Japan .

Primary Examiner—Henry J. Recla
Assistant Examiner—David J. Walczak
Attorney, Agent, or Firm—Lowe, Price, LeBlanc & Becker

[57] ABSTRACT

A valve device for controlling fuel vapor in a fuel tank is provided with a fuel-cut valve which is disposed between the fuel tank and a charcoal canister, and between a filler tube of the fuel tank and the charcoal canister. The fuel-cut valve is provided with a casing including upper and lower chambers. A lower float is disposed in the lower chamber and arranged to close the communication between a fuel tank and a charcoal canister when fuel height level in the fuel tank is raised to a first predetermined level. A upper float is disposed in the upper chamber and arranged to close the communication between the filler tube and the charcoal canister when the fuel height level in the filler tube is raised to a second predetermined level.

6 Claims, 6 Drawing Sheets

VALVE DEVICE FOR FUEL TANK

BACKGROUND OF THE INVENTION

1. Field of the Invention

The present invention relates to improvements in a control system for discharging fuel vapor generated in a fuel tank of an automotive vehicle.

2. Description of the Prior Art

Japanese Utility Model Provisional Publication No. 1-131619 discloses a typical valve device for controlling fuel vapor from a fuel tank having a filler tube. The valve device is arranged to discharge the fuel vapor from the fuel tank and the filler tube to a charcoal canister until a liquid fuel level in the fuel tank is raised to the upper portion of the filler tube. The discharging of the fuel vapor is controlled by one float disposed in the valve device. Accordingly, when the liquid fuel from the fuel tank lifts the float to close the communication between the filler tube and the charcoal canister is simultaneously closed. Therefore, in order to smoothly discharge the fuel vapor of the fuel tank and the filler tube during the fueling from the filler tube, it is necessary to accurately set the valve device at a proper height level which is the same as that of the upper portion of the filler tube. This setting of the valve device largely limits the flexibility of the part layout and design of automotive vehicles.

SUMMARY OF THE INVENTION

It is an object of the present invention to provide an improved fuel vapor control device which is free of the above-mentioned drawbacks.

According to the present invention, a device for controlling fuel vapor is attached to a fuel tank having a filler tube. The device comprises a vent tube which is communicated with a charcoal canister when a fuel gun is inserted into the filler tube for fueling. A sub-vent tube is communicated with the upper space of the filler tube. A fuel-cut valve includes upper and lower chambers and upper and lower floats. The upper chamber is communicated with the vent tube and the sub-vent tube. The lower chamber is communicated with an upper space of the fuel tank and the upper chamber. The upper float is disposed in the upper chamber, and stops the communication between the upper chamber and the lower chamber when liquid fuel from the fuel tank is fed to the lower chamber.

BRIEF DESCRIPTION OF THE DRAWINGS

In the drawings, like reference numerals designate like parts and elements throughout all figures, in which.

DETAILED DESCRIPTION OF THE INVENTION

Figure 1:
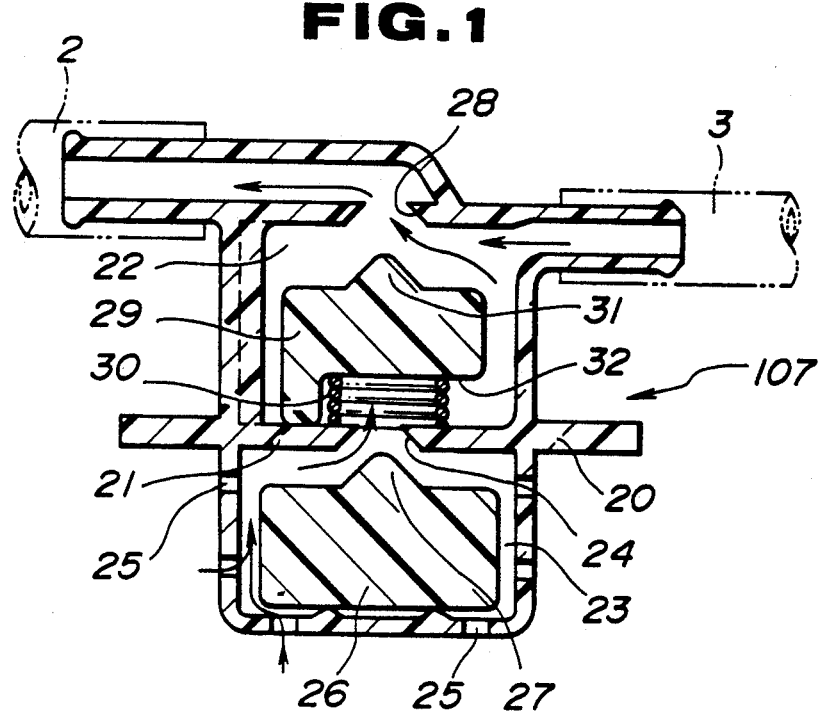
FIG. 1 is a cross-sectional view of a fuel-cut valve of a first embodiment of a fuel vapor processing device for a fuel tank according to the present invention.
Figure 2:
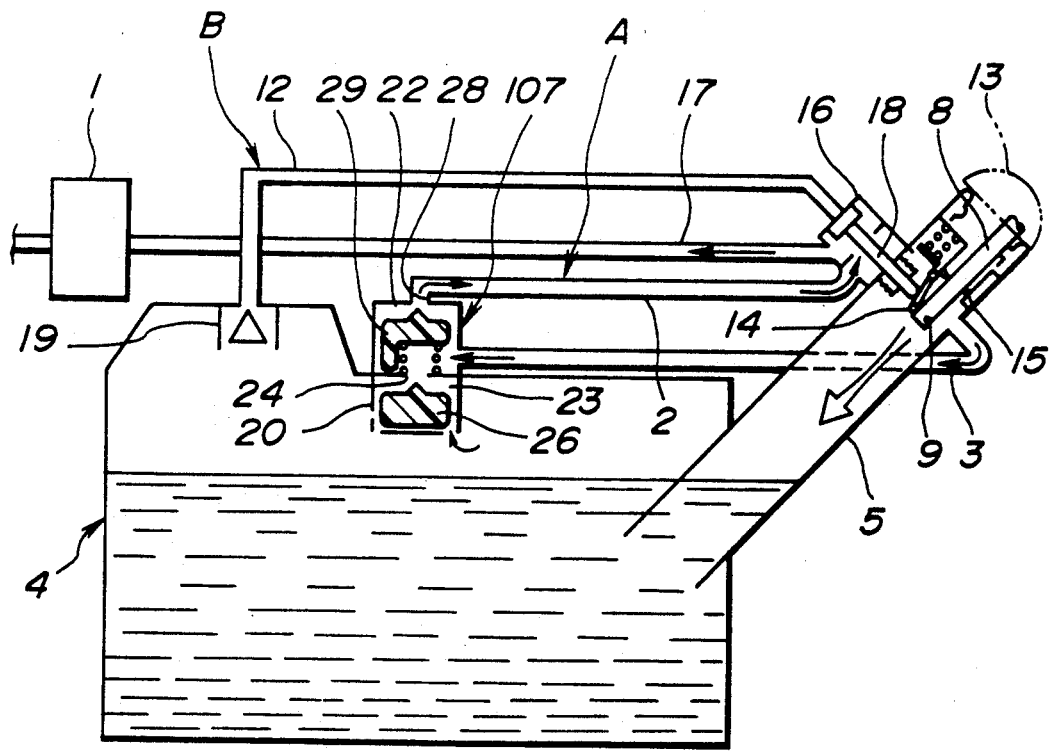
FIG. 2 is a schematic view of the first embodiment of the fuel vapor processing device for the fuel tank according to the present invention.

Referring now to FIGS. 1 and 2, there is shown a first embodiment of a device A for controlling fuel vapor from a fuel tank 4 and a filler tube 5 of the fuel tank 4 during the fueling to the fuel tank 4, according to the present invention.

The control device A according to the present invention is for an automotive vehicle and disposed to an upper portion of the fuel tank 4. The filler tube 5 is connected to the fuel tank 4 for supplying fuel to the fuel tank 4. A shutter 14 is attached to the upper end portion of the filler tube 5 for preventing fuel vapor from being directly discharged into the atmosphere under an opening condition of a fuel filler cap 13. A sealing member 15 is disposed to the upper portion of the filler tube 5 for preventing the fuel vapor from being discharged into the atmosphere through the clearance between the filler tube 5 and the nozzle of a fuel gun 8.

A charcoal canister 1 (or activated carbon canister) for absorbing fuel vapor from the fuel tank 4 and the filler tube 5 is communicated with the device A according to the present invention and a device B which discharges fuel vapor when the fuel tank 4 is not being fueled. The upper space in the fuel tank 4 is communicated through the vent tube 2 and an evaporation tube 12 with a valve chamber 16 disposed at a surrounding portion of the upper portion of the filler tube 5. The valve chamber 16 is communicated with the charcoal canister 1 through a tube 17. The valve chamber 16 includes a switching valve 18 which is operated according to the operation of the shutter 14. That is, the switching valve 18 is set to communicate the evaporation tube 12 and the canister 1 in the event of the closing condition of the shutter 14, and is set to communicate the vent tube 2 and the canister 1 in the event of the opening condition of the shutter 14.

A fuel-cut valve 107 is half embedded in the fuel tank 4 and connected to one end of the vent tube 2. The fuel-cut valve 107 is communicated with the filler tube 5 through a sub-vent tube 3. A second fuel-cut valve 19 is disposed at the end of the evaporation tube 12 connected to the fuel tank 3. The second fuel-cut valve 19 is arranged to close the evaporation tube 12 for preventing the flowing-out of the fuel in the event that the height level of the liquid fuel is charged due to the inclination of the vehicle and the like.

The fuel-cut valve 107 is provided with a casing 20 whose inside space is divided into an upper chamber 22 and a lower chamber 23 by a partition wall 21. The upper chamber 22 is communicated with the lower chamber 23 through a hole 24 of the partition wall 21 for allowing the communication between the upper and lower chambers 22 and 23. The lower chamber 23 is communicated with the fuel tank 4 through holes 25. A first float 26 made of a material lighter in specific gravity than liquid fuel is disposed int he lower chamber 23. The first float 26 is arranged so that its sealing portion 27 closes the hole 24 in the event that the liquid fuel in the fuel tank 4 is flowed into the lower chamber 23 to lift the first float 26 to the upper portion of the lower chamber 23.

Figure 4:
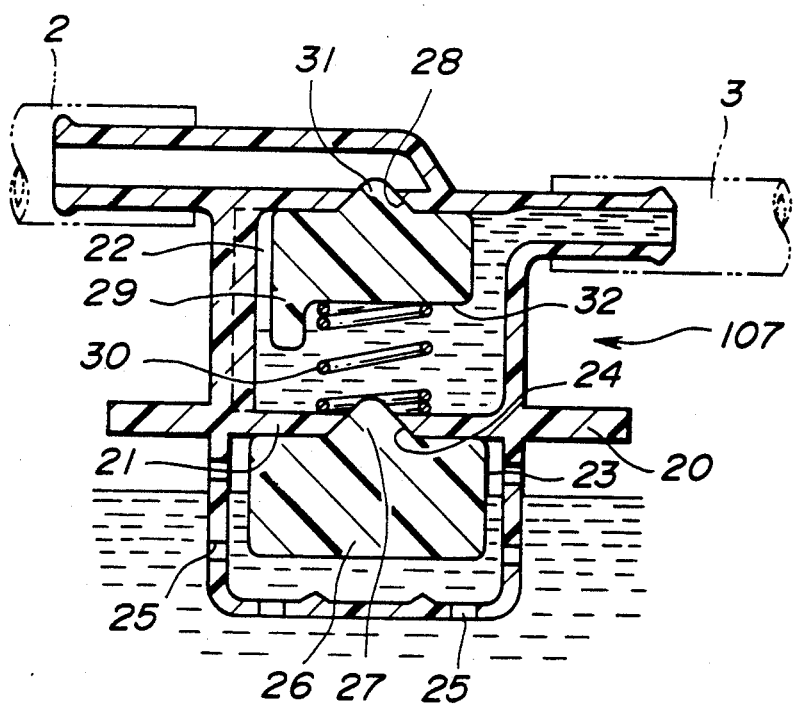
FIG. 4 is a cross-sectional view of the fuel-cut valve of FIG. 1 but showing another condition in that upper and lower floats are lifted by liquid fuel.

The upper chamber 22 is communicated with the vent tube 2 and the sub-vent tube 3. An upper wall defining the upper chamber 22 has a hole 28 through which the upper chamber 22 is communicated with the vent tube 2. A second float 29 made of a material heavier in specific gravity than the fuel is disposed in the upper chamber 22. The second float 29 is biased upwardly by a spring 30. The normally opened hole 28 is closed by the second float 29 when the first float 26 closes the hole 24 and the liquid fuel from the filler tube 5 is flowed into the upper chamber 22 through the sub-vent tube 3 so as to lift the second float 29 by the biasing force of the spring 30 and the buoyancy by the fuel, as shown in FIG. 4. A part of the lower portion of the second float 29 is cut-out to form a cut-out portion 32 through which the upper space of the lower chamber 23 is communicated with the lower space of the upper chamber 22.

Figure 3:
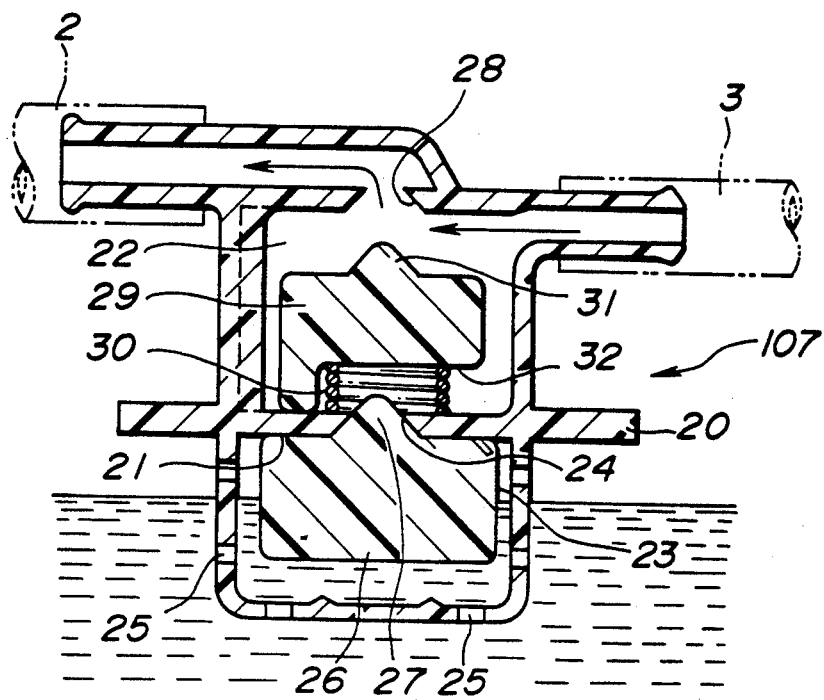
FIG. 3 is a cross-sectional view of the fuel-cut valve of FIG. 1 but showing a condition in that liquid fuel in the fuel tank lifts a lower float of the fuel-cut valve so as to close the communication between upper and lower chambers of the fuel-cut valve.

The manner of operation of the thus arranged device will be discussed hereinafter with reference to FIGS. 3 to 5.

When the liquid fuel is supplied to the fuel tank 4 upon inserting the fuel gun 8 to the filler tube 5, the fuel vapor control device A is operated according to the height level of the fuel liquid in the fuel tank 4 and the filler tube 5 as follows:

In an early period of the fueling, since the fuel level is lower than that of the bottom of the fuel-cut valve 107, the first and second floats 26 and 29 are in opening condition. Accordingly, the fuel vapor in the fuel tank 4 easily passes through the fuel-cut valve 107 and is fed to the charcoal canister 1 through the through-hole 28, the vent tube 2 and the tube 17. The fuel vapor in the filler tube 5 is fed to the upper chamber 22 through the sub-vent tube 3 and fed to the charcoal canister 1 with the fuel vapor in the fuel tank 4.

When the fuel level in the fuel tank 4 is raised to a first predetermined height level, the fuel flows into the lower chamber 23 through the through-holes 25. The first float 26 is lifted by the fuel flowed into the lower chamber 23 to close the hole 24, as shown in FIG. 3. With this operation, the upper space of the fuel tank 4 is sealing closed. Then, only the fuel level of the filler tube 5 is raised by the fueling through the filler tube 5. The fuel vapor in the filler tube 5 is discharged to the charcoal canister 1 through the upper chamber 22, the through-hole 28 and the vent tube 2 until the liquid fuel level is raised to the height near the upper end of the filler tube 5.

When the fuel height level is raised to a second predetermined height level near the upper end of the filler tube 5, an auto-stop sensor 9 of the fuel gun 8 detects that the fuel height level reaches to the second predetermined height level. Then, the fuel supply through the fuel gun 8 is stopped according to the fuel-level detection by the auto-stop sensor 9.

If the auto-stop sensor 9 is in trouble or the additional fuel is further supplied to the fuel tank, the fuel in the filler tube 5 is fed to the upper chamber 22 through the sub-vent tube 3. This fuel-flow to the upper chamber 22 lifts the second float 29 so that the hole 28 is closed by the second float 29 as shown in FIG. 4. This prevents the liquid fuel from flowing into the charcoal canister 1.

After the fueling to the fuel tank 4, the first and second floats 26 and 29 open the holes 24 and 28, respectively according to the lowering of the fuel level in respond to the fuel consumption in an engine (not shown) of the automotive vehicle.

Figure 5:
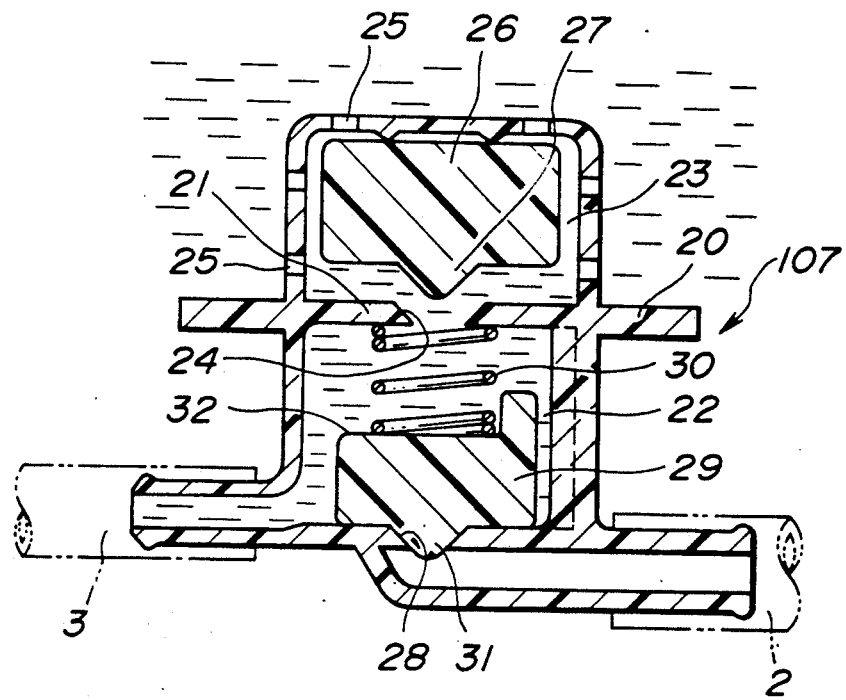
FIG. 5 is a cross-sectional view of the fuel-cut valve of FIG. 1 which is in a rolled-over condition of the vehicle.

When the automotive vehicle is rolled over in a traffic accident and the like, the fuel-cut valve 107 is set such that the second float 29 sealingly closes the hole 28 due to its weight and the biasing force of the spring 30 while the first float 26 is lifted by the fuel to open the hole 24, as shown in FIG. 5. Accordingly, the liquid fuel in the fuel tank 4 and the filler 5 is prevented from flowing into the charcoal canister 1 through the vent tube 2.

With the thus arrange device, even if the fuel-cut valve 107 is set at a height level lower than that of the upper end portion of the filler tube 5, the fuel vapor in the filler tube 5 is smoothly discharged to the charcoal canister 1. This enables to set the fuel-cut valve 107 at further lower height level and therefore increases the flexibility of the layout of parts.

Figure 6:
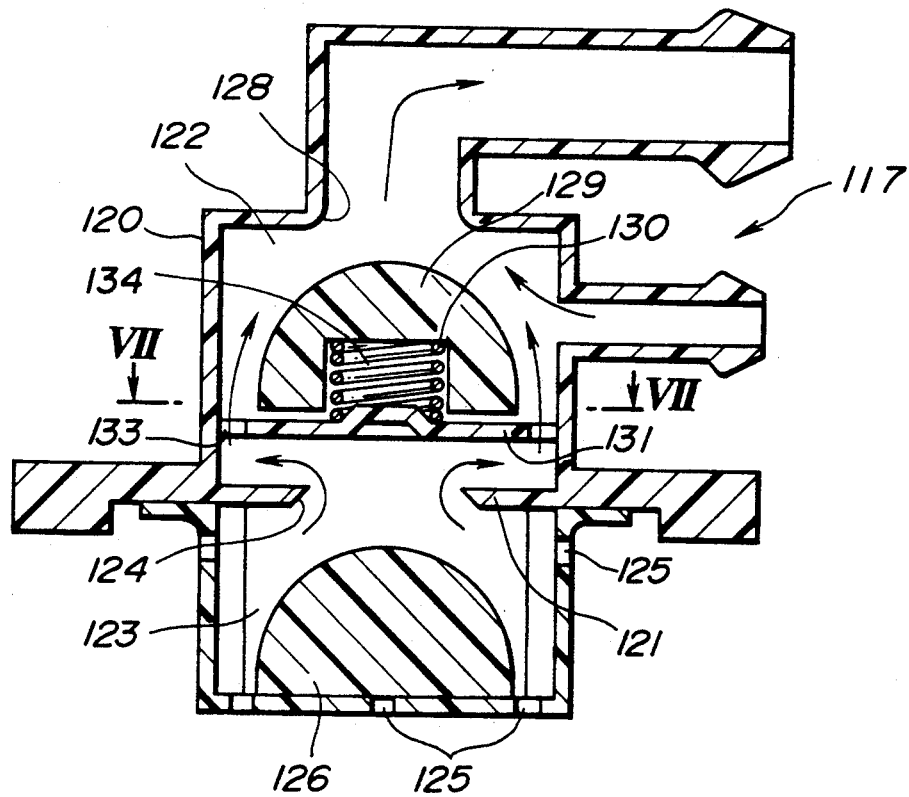
FIG. 6 is a cross-sectional view of a fuel-cut valve of a second embodiment of the fuel vapor processing device for the fuel tank according to the present invention.
Figure 7:
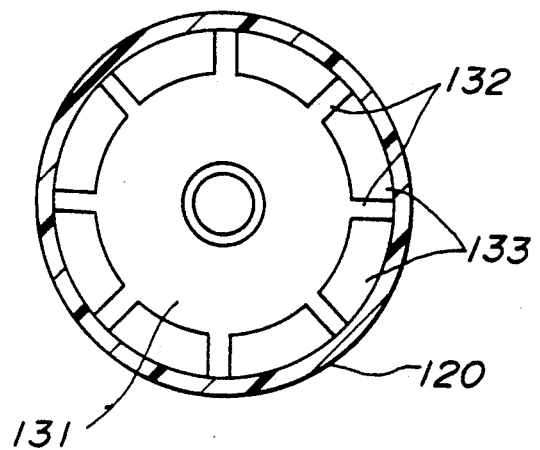
FIG. 7 is a cross-sectional view of the fuel-cut valve of FIG. 6 taken in the direction of arrows substantially along the line VII—VII.
Figure 8:
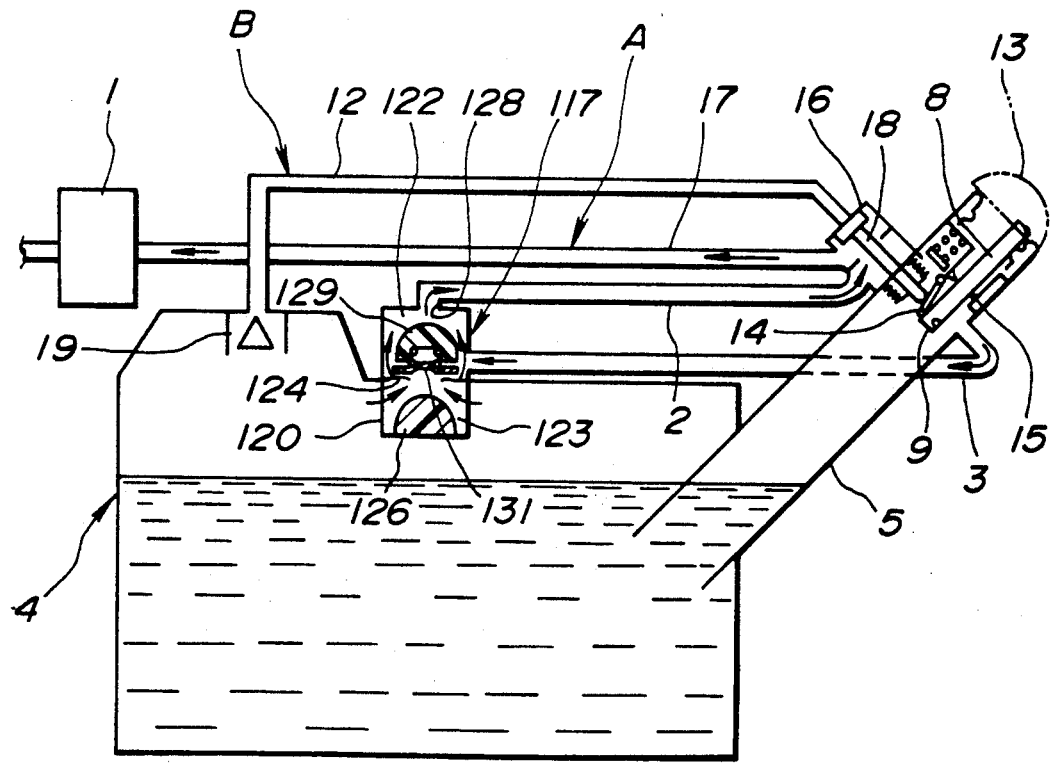
FIG. 8 is a schematic view of the second embodiment of the fuel vapor processing device for the fuel tank according to the present invention.

FIGS. 6 to 8 illustrate a second embodiment of the device for controlling fuel vapor from the fuel tank according to the present invention. The second embodiment is essentially similar to the first embodiment except that a fuel-cut valve 117 is different from the fuel-cut valve 107 of the first embodiment, as clearly shown in FIGS. 6 and 8.

The fuel-cut valve 117 is half embedded in the fuel tank 4 and connected to one end of the vent tube 2. The fuel-cut valve 117 is communicated with the filler tube 5 through a sub-vent tube 3. A second fuel-cut valve 19 is disposed at the end of the evaporation tube 12 connected to the fuel tank 3. The second fuel-cut valve 19 is arranged to close the evaporation tube 12 for preventing the flow-out of the fuel in the event that the fuel level is changed due to the inclination of the vehicle and the like.

As shown in FIGS. 6 and 7, the fuel-cut valve 117 is provided with a casing 120 whose inside space is divided into an upper chamber 122 and a lower chamber 123 by a partition wall 121. The upper chamber 122 is communicated with the lower chamber 123 through a hole 124 formed to the partition wall 121 for allowing the communication between the upper and lower chambers 122 and 123. The lower chamber 123 is communicated with the fuel tank 4 through holes 125. A first float 126 is made of a material lighter is specific gravity than the fuel and formed semi-spherical. The first float 126 is disposed in the lower chamber 123 so that is spherical surface closes the hole 124 in the event that the fuel level is raised to lift the first float 215 to the upper portion of the lower chamber 123.

Figure 10:
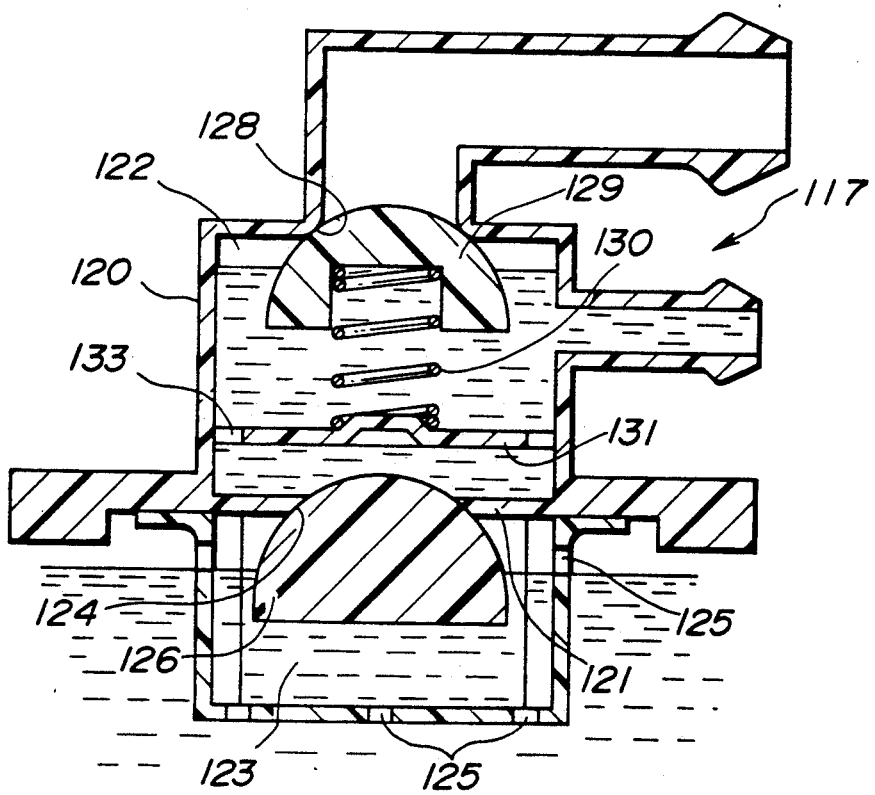
FIG. 10 is a cross-sectional view of the fuel-cut valve of FIG. 6 but showing another condition in that upper and lower floats are filled with liquid fuel.

The upper chamber 122 is communicated with the vent tube 2 and the sub-vent tube 3. An upper wall defining the upper chamber 122 has a hole 128 through which the upper chamber 122 is communicated with the vent tube 2. A disc shaped screen plate 131 is disposed in the upper chamber 122 so as to be parallel with the partition wall 121. The screen plate 131 is fixedly supported to the inner wall of the upper chamber through a plurality of supporting members 132 as shown in FIG. 5. The screen plate 131 is located above the partition wall 121 so as to prevent the fuel vapor from directly blowing up to the upper chamber 122. A second float 129 is made of a material heavier in specific gravity than the fuel, and formed semispherical while having a recess 134 to a flat surface of the second float 129. The second float 129 is disposed in the upper chamber 212 and is biased upwardly by a spring 130 which is set in the recess 134. The bottom surface of the second float 129 is slightly smaller in diameter than the screen plate 131 so as to avoid the fuel vapor which passes through openings 133 defined around the screen plate 131. The normally opened hole 128 is closed by the second float 129 when the first float 129 closes the hole 124 and the liquid fuel is flowed in the upper chamber 122 through the sub-vent tube 3 so as to lift the second float 129 by the biasing force of the spring 130 and the buoyancy by the fuel, as shown in FIG. 10.

Figure 9:
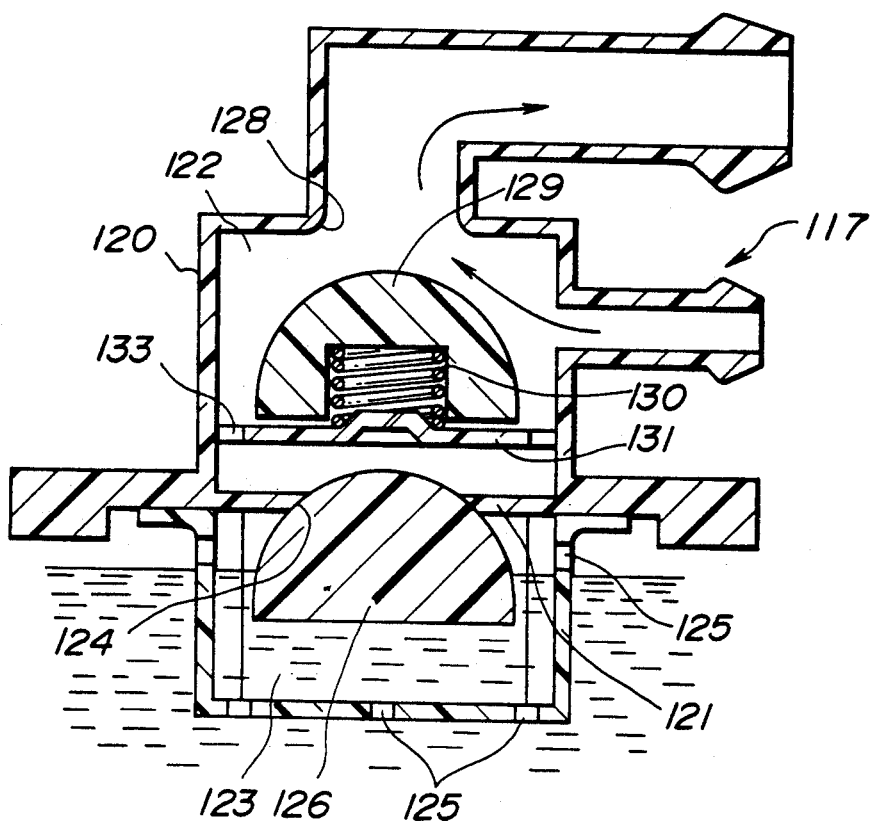
FIG. 9 is a cross-sectional view of the fuel-cut valve of FIG. 6 but showing a condition in that liquid fuel in the fuel tank lifts a lower float of the fuel-cut valve so as to close the communication between upper and lower chambers of the fuel-cut valve.

The manner of operation of the thus arranged device will be discussed hereinafter with reference to FIGS. 9 to 11.

When the liquid fuel is supplied to the fuel tank 4 upon inserting the fuel gun 8 to the filler tube 5, the fuel vapor control device is operated according to the height level of the fuel liquid in the fuel tank 4 and the filler tube 5 as follows:

In an early period of the fueling, since the fuel level is lower than the bottom of the fuel-cut valve 117, the first and second floats 126 and 129 are in opening condition. Accordingly, the fuel vapor in the fuel tank 4 easily passes through the fuel-cut valve 107 and is fed to the charcoal canister 4 through the through-hole 128, the vent tube 2 and the tube 17. The fuel vapor in the filler tube 5 is fed to the upper chamber 122 through the sub-vent tube 3 and fed to the charcoal canister 1 with the fuel vapor in the fuel tank 4. When the fuel vapor passing through the hole 124 passes through the upper chamber 122, the fuel vapor is fed to a peripheral portion of the screen plate 131, and passes through the holes 133, and is fed along the spherical surface of the second float 129 to the through-hole 128. This flowing of the fuel vapor prevent the second float 129 from being lifted by the flowing of the fuel vapor so as to close the through-hole 128.

When the fuel height level in the fuel tank 4 is raised to a first predetermined height level, the fuel flows into the lower chamber 123 through the through-holes 125. The first float 126 is lifted by the liquid fuel flowed into the lower chamber 123 to close the hole 124, as shown in FIG. 9. With this operation, the upper space of the fuel tank 4 is sealing closed. Then, only the fuel level of the filler tube 5 is raised by filling the fuel through the filler tube 5. The fuel vapor in the filling tube 5 is discharged to the charcoal canister 1 through the upper chamber 122, the through-hole 128 and the vent tube 2 until the liquid fuel level is raised to the height near the upper end of the filler tube 5.

When the fuel level is raised to a second predetermined height level near the upper end of the filler tube 5, an auto-stop sensor 5 of the fuel gun 9 detects that the fuel level reaches to the second predetermined height level. Then, the fuel supply through the fuel supply gun is stopped according to the fuel-level detection by the sensor 5.

If the auto-stop sensor 5 is in trouble or the additional fuel is further supplied to the fuel tank, the fuel in the filler tube 5 is fed to the upper chamber 122 through the sub-vent tube 3. This fuel increase in the upper chamber 122 lifts the second float 129 so that the hole 128 is closed by the second float 129 as shown in FIG. 10. This prevent the liquid fuel from flowing into the charcoal canister 1.

After the fueling to the fuel tank 4, the first and second floats 126 and 129 open the holes 124 and 128, respectively according to the lowering of the fuel level in respond to the fuel consumption in engine (not shown).

Figure 11:
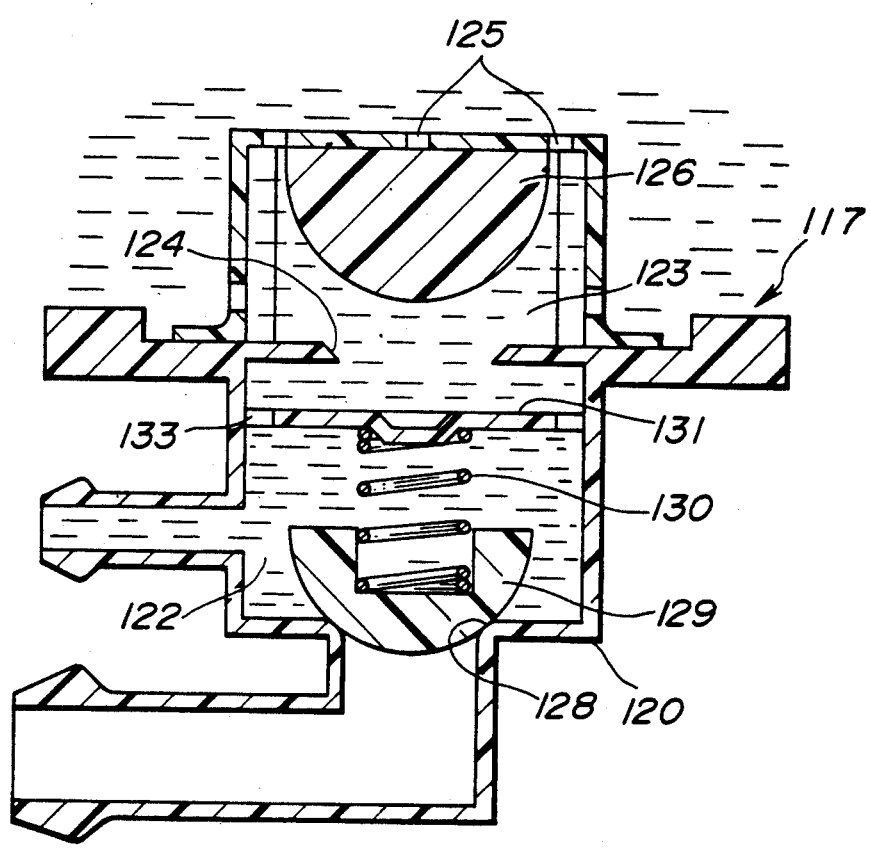
FIG. 11 is a cross-sectional view of the fuel-cut valve of FIG. 6 which is in a roll-over condition of the vehicle.

When the automotive vehicle is rolled over in a traffic accident and the like, the fuel-cut valve 117 is set such that the second float 129 sealingly closes the hole 128 due to its weight and the biasing force of the spring 130 while the first float 126 is lifted by the fuel to open the hole 124, as shown in FIG. 11. Accordingly, the liquid fuel in the fuel tank 4 and the filler tube 5 is prevented from flowing into the charcoal canister 1 through the vent tube 2.

What is claimed is:

1. A device for controlling fuel vapor in a fuel tank having a filler tube, said device comprising:
   a vent tube including means for connecting said vent tube to a charcoal canister when a fuel gun is inserted into the filler tube for fueling;
   a sub-vent tube adapted to be connected to an upper space in the filler tube; and
   a fuel-cut valve including:
     means defining an upper chamber which is connected with said vent tube and said sub-vent tube,
     means defining a lower chamber which is adapted to be connected with an upper space in the fuel tank and connected to the upper chamber;
     an upper float disposed in the upper chamber, the upper float stopping communication between the upper chamber and said vent tube when liquid fuel from the filler tube is fed into the upper chamber;
     a lower float disposed in the lower chamber, the lower float stopping communication between the upper chamber and the lower chamber when liquid fuel from the fuel tank is fed to the lower chamber.

2. A fuel-cut valve for an automobile fuel tank, said fuel-cut valve adapted to be disposed between the fuel tank and a charcoal canister, and between a filler tube of the fuel tank and the charcoal canister, said fuel-cut valve comprising:
   a casing including an upper chamber and a lower chamber which are divided by a partition wall, the upper chamber adapted to be communicated with the charcoal canister through a first upper hole, and adapted to be communicated with an upper portion of the filler tube through a second upper hole, the lower chamber being communicated with the upper chamber through a first lower hole in the partition wall, the lower chamber adapted to be communicated with the fuel tank through a plurality of second lower holes in the lower chamber of said casing;

a lower float disposed in the lower chamber so as to close the first lower hole in the partition wall when liquid fuel from the fuel tank is flowed into the lower chamber; and an upper float disposed in the upper chamber so as to close the first upper hole of the upper chamber when liquid fuel from the filler tube is flowed into the upper chamber.

3. A device as claimed in claim 1, wherein the upper float is made of a material heavier in specific gravity than liquid fuel and biased upwardly by a spring disposed in the upper chamber.

4. A device as claimed in claim 3, wherein the upper float is lifted by the liquid fuel flowed in the upper chamber and the spring to stop the communication between the upper chamber and said vent tube.

5. A device as claimed in claim 1, wherein the lower float is made of a material lighter in specific gravity than liquid fuel.

6. A fuel-cut valve as claimed in claim 2, wherein said casing further includes a screen plate disposed above the partition wall, the screen plate having a plurality of holes which are disposed at outer peripheral portions of the screen plate.

* * * * *